United States Patent [19]

Tenney

[11] Patent Number: 4,958,761
[45] Date of Patent: Sep. 25, 1990

[54] DEBRIS DEFLECTOR FOR TRANSPORTED CYCLE

[76] Inventor: Allen Tenney, Box 75, Saddleback, Bend, Oreg. 97701

[21] Appl. No.: 360,290

[22] Filed: Jun. 2, 1989

Related U.S. Application Data

[63] Continuation-in-part of Ser. No. 150,732, Feb. 1, 1988, abandoned.

[51] Int. Cl.⁵ .................. B60R 27/00; B62J 23/00
[52] U.S. Cl. .................. 224/316; 224/30 R; 296/78.1
[58] Field of Search ........... 224/30 R, 32 R, 37 R, 224/309, 315, 316, 324, 326, 328, 319, 331; 296/78.1, 91; 180/84; 280/770, 152.2, 152.3, 288.4, 304.3

[56] References Cited

U.S. PATENT DOCUMENTS

| | | | |
|---|---|---|---|
| 595,240 | 12/1897 | Lincoln | 224/32 R |
| 597,298 | 1/1848 | Ross | 296/78.1 |
| 3,087,661 | 4/1963 | Glenny | 224/32 R |
| 4,009,810 | 3/1977 | Shook | 224/39 |
| 4,655,497 | 4/1987 | Mallett | 296/78.1 |
| 4,813,583 | 3/1989 | Carpenter | 224/30 R |

FOREIGN PATENT DOCUMENTS

| | | | |
|---|---|---|---|
| 116009 | 10/1942 | Australia | 296/78.1 |
| 3034750 | 4/1982 | Fed. Rep. of Germany | 224/319 |
| 331745 | 11/1935 | Italy | 296/78.1 |

*Primary Examiner*—Henry J. Recla
*Assistant Examiner*—Glenn T. Barrett
*Attorney, Agent, or Firm*—Chernoff, Vilhauer, McClung & Stenzel

[57] ABSTRACT

A device for the protection of a transported bicycle, tricycle or motorcycle from debris is disclosed. The device is a rigid arcuate shield coextensive with the height of the cycle frame, and having hangers secured to the upper portion and brackets secured to the lower portion. The shield is installed substantially perpendicular to the direction of travel by engaging the hangers with the cross member portion of the cycle handlebars and by engaging the brackets with the cycle front axle or with the front quick-release mechanism of a cycle rack. The width of the shield and the outer angle of the shield's convex surface are selected so as to achieve the desired field of aerodynamic deflection.

8 Claims, 1 Drawing Sheet

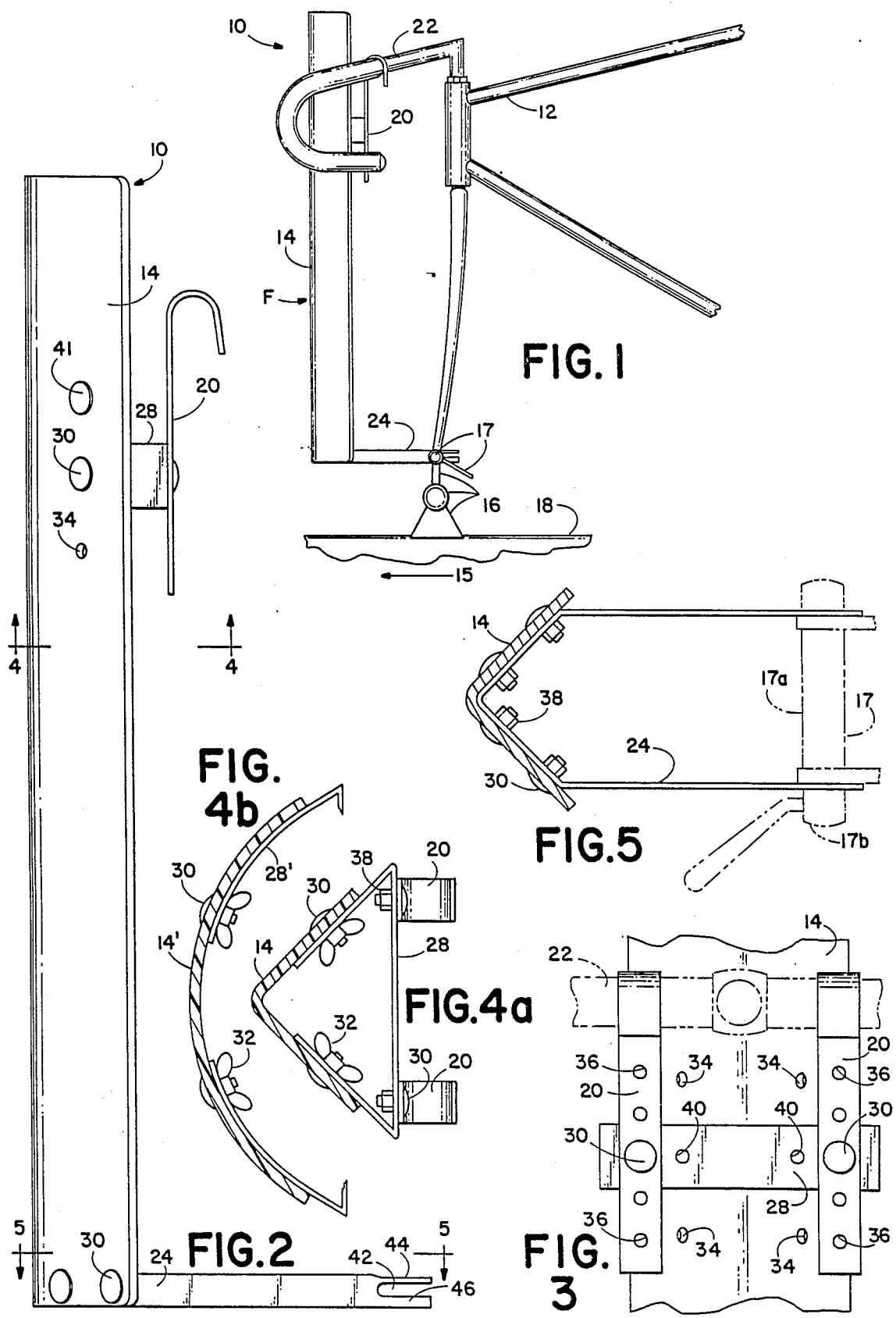

DEBRIS DEFLECTOR FOR TRANSPORTED CYCLE

BACKGROUND OF THE INVENTION

This is a continuation-in-part of application Ser. No. 07/150,732 filed Feb. 1, 1988, now abandoned.

The present invention is directed to a device for the protection of a transported cycle such as a bicycle, tricycle, or motorcycle, from solid particulates such as grit, rock particles, insects and similar debris. The device is particularly suited for attachment to an automobile rooftop bicycle rack with a quick-release, front fork-engaging mechanism.

Bicycling and motorcycling, off-road, recreational, and competitive, have enjoyed an enormous increase in popularity in recent years. This increase in popularity has been accompanied by a demand for cycle transport equipment capable of efficiently transporting and protecting ever more expensive cycles.

Bicycle and similar cycle racks serve to secure the cycle frame to the transporting automobile, typically on the vehicle's roof or to the bed of a trailer. Unfortunately, such racks generally provide no protection to the cycle frame from collision with frequently-encountered road debris and insects. Such damage to a cycle frame is cumulative and, in the case of a more expensive cycle, very costly to repair. If left unattended, even minor damage to the paint will ultimately result in more extensive corrosion damage. At a minimum, the soiling and damage to a cycle's painted surfaces is unsightly and often difficult to clean.

Heretofore, the only effective debris protection available for a transported cycle was a full cover of suitable material which totally enclosed the cycle. Such protective covers, however, are expensive and are principally designed for stationary storage. Such covers are generally bulky and are awkward and burdensome to store, install and remove, particularly when applied from ground level to a cycle mounted at the rooftop level of a vehicle. Further, such covers impede the aerodynamic efficiency of the transporting vehicle, and frequently result in undesired wind noise. Finally, such covers can adversely affect the transporting vehicle's stability when crosswinds are encountered, thereby threatening both driving safety and the cycle's secure attachment to the vehicle.

Therefore, a need exists for an inexpensive device that efficiently protects transported cycles from debris, which is simple to store, to install, and to remove and yet does not detrimentally affect the stability and handling of the transporting vehicle.

SUMMARY OF THE INVENTION

The present invention is directed to a cycle deflector which solves all of the aforementioned deficiencies of the prior art in a mutually compatible fashion. The need for a small, effective, lightweight and aerodynamic debris deflector for a transported bicycle, which is easy to install and remove and which enhances the aerodynamic stability of the transported cycle, is satisfied by employing a rigid, substantially arcuate shield the length of which is substantially coextensive with the height of the cycle frame. The rigid shield is rigidly secured by hanger means to the cycle handlebars and by bracket means engageable with a quick-release front fork-engaging mechanism of the cycle rack. The width of the shield and the outer angle of the shield's convex surface are selected so as to achieve the desired field of aerodynamic deflection. Another advantage of the present invention is that, in operation, the deflector utilizes impinging wind force to hold the cycle frame more securely to the rack.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is an overall side view of an exemplary embodiment of a debris deflector in accordance with the present invention in use with a cycle and a cycle rack.

FIG. 2 is a detailed side view of the debris deflector of FIG. 1.

FIG. 3 is a top rear view of the handle bar-engaging hanger portion of the debris deflector of FIG. 1.

FIG. 4a is a sectional view taken along line 4—4 of FIG. 2.

FIG. 4b is a sectional view taken along line 4—4 of an alternative embodiment of the present invention.

FIG. 5 is a sectional view taken along line 5—5 of FIG. 2.

DETAILED DESCRIPTION OF THE INVENTION

Referring to the drawings, wherein like numerals refer to the same elements, and in particular to FIG. 1, a preferred embodiment of the present invention is shown as comprising an aerodynamic debris deflector 10 for the protection of a transported cycle frame 12. A shield 14 is of substantially arcuate configuration and is preferably made of a rigid light-weight plastic material such as a polycarbonate such as Lexan ® (made by General Electric Company of Pittsfield, Mass.), or an acrylic such as Plexiglass ® (made by Rohm & Haas Company of Chesterfield, Md.). In FIG. 1, a cycle frame 12 is shown mounted to a cycle rack 16 by means of a quick-release mechanism 17 comprising a hub 17a and a compression ratchet 17b (17a and 17b being shown in FIG. 5). The directional arrow 15 denominates the direction of travel. The rack 16 is secured by conventional means to the roof or bed 18 of a transporting vehicle or trailer. The length of shield 14 corresponds substantially to the height of the cycle frame 12. The shield 14 is symmetrically positioned forward of the frame 12 with the convex surface of the shield facing in the same direction of travel 15 so as to present an aerodynamic surface in the direction of travel. The upper portion of shield 14 is rigidly secured to the cycle frame 12 by means of rigid hangers 20 which engage the cross member portions of the cycle's handlebars. The lower end of the shield 14 is rigidly secured to the cycle rack 16 by a rigid lower bracket 24 which engages the quick-release mechanism 17 of cycle rack 16. In applications involving a cycle rack without a front fork-engaging mechanism, the shield 14 is rigidly secured to the cross member portions of the cycle's handlebars as previously described and is rigidly secured to the front axle by attachment of the rigid lower bracket 24 between the cycle frame front fork and the front axle attachment means, typically a quick release mechanism or axle nut.

Referring to FIGS. 2, 3 and 4a, a nearly triangular rigid top bracket 28 is adjustably secured to shield 14 by means of carriage bolts 30 and wing nuts 32 applied to one of three sets of holes 34 located at incremental positions along the top of shield 14. To provide further adjustability, rigid hangers 20 are also provided with a series of holes 36 at incremental positions along the hanger length below the curved portions. Each rigid hanger 20 is adjustably secured to the top bracket 28 both vertically and horizontally by a carriage bolt 30 and nut 38 applied through both a selected top bracket hole 40 and a selected hanger bracket hole 36. As shown in FIG. 2, plastic plugs 41 of carriage bolt configuration may be used to close the unselected shield holes 34.

The width and outer angle of the generally arcuate surface of rigid shield 14 may be varied so as to achieve the desired field of aerodynamic deflection FIG. 4b illustrates a generally convex-surfaced shield 14. To accommodate such shield variations, nonrectangular configurations of the top bracket, designated as 28', and modified configurations of lower bracket 24 (not illustrated), may be utilized.

Referring now to FIGS. 2 and 5, a substantially U-shaped rigid bracket 24 with forked ends comprising gap 42 and prongs 44 and 46 is secured by means of carriage bolts 30 and nuts 38 to the bottom of shield 14. As best seen in FIG. 1, the length of lower bracket 24 and the depth of gap 42 allow lateral adjustment of the engagement of prongs 44 and 46 with the quick-release mechanism 26 of rack 16 so as to permit the positioning of the shield 14 substantially perpendicular to the direction of travel 15. The top edge of prong 44 may be tapered as shown in FIG. 2 so as to facilitate mounting to the cycle rack 16 when the frame 12 is equipped with various accessories, for example cyclo-computer sending units, at the cycle's front fork. It can be seen in FIG. 1 that the arrangement of handlebar engaging hangers 20 and lower bracket 24, when installed, provides a secondary structural attachment between the cycle frame 12 and the cycle rack 16 which, when a wind force F impinges upon the rigid shield, translates this force through the lower bracket 24 onto the quick-release mechanism 17 of rack 16, thereby preventing disengagement of the lower bracket 24 from even a loosely engaged quick-release mechanism 17.

The hangers 20, top bracket 28 and lower bracket 24 are preferably fabricated from an aluminum alloy to minimize the weight of the deflector 10 and to achieve the desired degree of durability and strength. The hangers 20 and brackets 24, 28 are preferably coated with thermoplastic or elastomeric material to inhibit corrosion and to minimize any scratching, denting or other damage resulting from inadvertent contact with the cycle frame 12 during installation and removal of the debris deflector 10.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for aerodynamically, deflecting debris away from a transported cycle or a cycle rack having its front wheel removed and having a frame and handlebars with a cross member portion comprising:
   (a) a generally arcuate continuous rigid shield of lightweight plastic material substantially coextensive with the height of said cycle frame and having an upper portion and a lower portion;
   (b) rigid hook-shaped hanger means rigidly secured to said upper portion of said shield for rigid engagement with the cross member portion of said handlebars of said cycle;
   (c) rigid bracket means rigidly secured to said lower portion of said shield for rigid engagement with said cycle rack; and
   (d) said hanger means and said bracket means being sized and shaped such that said shield is positioned at least partially in the space normally occupied by said front wheel when mounted on said cycle.

2. Apparatus for transporting and producing a cycle on a cycle rack, said cycle having a frame and handlebars with a cross member portion and having its front wheel removed, said apparatus comprising in combination:
   (a) a cycle rack with a quick-release means for engaging the forks of a cycle;
   (b) a generally arcuate continuous rigid shield of lightweight plastic material substantially coextensive with the height of said cycle frame and having an upper portion and a lower portion adapted to be positioned in front of said frame and handlebars;
   (c) rigid hook-shaped hanger means rigidly secured to said upper portion of said shield for rigid engagement with the cross member portion of said handlebars of said cycle;
   (d) rigid bracket means rigidly secured to said lower portion of said shield for engagement with said quick-release means of said cycle rack; and
   (e) said hanger means and said bracket means being sized and shaped such that said shield is positioned at least partially in the space normally occupied by said front wheel when mounted on said cycle.

3. The apparatus of claim 2 wherein said cycle rack is an automobile roof rack.

4. The apparatus of claim 1 or 2 wherein said hanger means and said bracket means are adjustably secured to said upper portion and to said lower portion of said shield, respectively.

5. The apparatus of claim 1 or 2 wherein said bracket means is U-shaped.

6. The apparatus of claim 1 or 2 wherein said bracket means has forked ends.

7. The apparatus of claim 1 or 2 wherein said hanger means and said bracket means are substantially coated with a protective material.

8. The apparatus of claim 7 wherein said protective material is selected from thermoplastic and elastomeric materials.

* * * * *